United States Patent [19]

Kawamoto et al.

[11] Patent Number: 4,697,816
[45] Date of Patent: Oct. 6, 1987

[54] FRONT AND REAR WHEEL STEERING DEVICE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 822,043

[22] Filed: Jan. 24, 1986

[30] Foreign Application Priority Data

Jan. 24, 1985 [JP] Japan ................................ 60-011837

[51] Int. Cl.$^4$ ............................................. B62D 5/06
[52] U.S. Cl. ..................................... 280/91; 180/143; 180/234
[58] Field of Search ................... 280/91; 180/141, 142, 180/143, 234, 236

[56] References Cited

U.S. PATENT DOCUMENTS 4,572,316  2/1986  Kanazawa et al. ................. 180/143

Primary Examiner—David M. Mitchell
Assistant Examiner—Kenneth R. Rice
Attorney, Agent, or Firm—Lyon & Lyon

[57] ABSTRACT

In a front and rear wheel steering device for a vehicle in which the steering angle ratio of the rear wheels relative to the front wheels is variable according to the vehicle speed, by accounting for the magnitude of vehicle acceleration in determining the steering angle ratio of the rear wheels by selecting a mathematical function from a plurality thereof, the vehicle response particularly in high speed range can be improved. Smooth transition from a certain characteristics to another may be achieved either by preparing a number of mathematical functions of vehicle speed for the steering angle ratio of the rear wheels or providing some time delay in the transition from one characteristics to another, preferably in proportion to the magnitude of the vehicle acceleration.

7 Claims, 7 Drawing Figures (a)

(b)

(c)

FRONT AND REAR WHEEL STEERING DEVICE

FIELD OF THE INVENTION

This invention relates to an improvement of a front and rear wheel steering device for a vehicle which can variably control the steering angle of the rear wheels in relation with the steering angle of the front wheels.

DESCRIPTION OF THE PRIOR ART

There have been a number of proposals to provide front and rear wheel steering devices particularly in the form of four wheel steering devices. For instance, Japanese Patent Application No. 53-163678 (Japanese Patent Laying-Open Publication No. 55-91457) corresponding to U.S. Pat. No. 4,313,514, filed by the Assignee of the present application, proposes a front and rear wheel steering device for vehicle which steers the rear wheels in relation with the steering of the front wheels in the same phase relationship in high speed range and in the opposite phase relationship in low speed range. The steering angle ratio is a continuous function relative to the vehicle speed, for instance, as indicated by "Q" in FIG. 5.

Thus, a continuous control of the steering angle ratio is performed according to this continuous function Q so that the function of the steering device may be favorable in both high speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

In particular, by controlling the steering angle ratio of the rear wheels according to the mathematical function $f(u)=(A-Bu^2)/(C-Du^2)$ as proposed in Japanese Patent Application No. 55-84519 (Japanese Patent Laying-Open Publication No. 57-11173), it is theoretically possible to reduce the slip angle of the vehicle to zero and the vehicle is allowed to run along the tangent of a circle defined around the center of turning whereby the burden on the driver in controlling the motion of the vehicle can be effectively reduced. And, also, that the phase delay of the response of the vehicle to lateral acceleration is thereby reduced contributes to the improvement of the driving response of the vehicle.

However, the above-mentioned mathematical function is derived upon assumption that the vehicle is undergoing a steady turn or turning at a constant radius at a constant speed, but, in reality, the vehicle often turns while accelerating or decelerating. This is because, while the driver, in driving a curved road at a relatively high speed, normally predicts the curvature of the next curve and enters the curve after adjusting the vehicle speed to the curvature of the next curve, in many cases, the driver is required to readjust the vehicle speed after entering the curve.

According to experiments conducted by the Inventors, it was found that, when the steering angle ratio is controlled so as to reduce the slip angle to zero with the assumption that the vehicle speed is constant, a desired result is not necessarily obtained. Specifically, the vehicle tends to cut inside the curve when the vehicle is decelerating and the trajectory of the vehicle tends to swerve to the outside of the curve when vehicle is accelerating. Further, it was found that the driving response of the vehicle can be drastically improved if the acceleration of the vehicle or the change rate of the vehicle speed is taken into account.

SUMMARY OF THE INVENTION

In view of such problems, a primary object of this invention is to provide a front and rear wheel steering device for vehicle according to which the driving response of the a vehicle is improved and the driving of the vehicle is made more comfortable and safer by appropriately determining the property of the steering angle ratio function in the front and rear wheel steering device for vehicle.

Another object of the present invention is to provide a front and rear wheel steering device fro vehicle according to which the driving response is automatically improved without the driving taking any special action.

According to the present invention, such objects are accomplished by providing a front and rear wheel steering device for vehicle for variably controlling the steering angle ratio of rear wheels relative to the steering angle of front wheels according to vehicle speed, comprising: a vehicle speed sensor; a selection means for selecting a mathematical function from a plurality of mathematical functions representing the steering angle ratio of the rear wheels according to the change rate of the vehicle speed; and a rear wheel steering means for achieving a steering angle corresponding to the selected mathematical function.

Thus, by taking into account not only the vehicle speed but also the change rate of the vehicle speed in determining the steering angle ratio of the rear wheels in a front and rear wheel steering device, the driving response of the vehicle can be drastically improved.

According to a certain aspect of the present invention, at least one of the mathematical functions is positive in high speed range and negative in low speed range so as to steer the rear wheels in same phase relationship to the front wheels in high speed range and in opposite phase relationship in low speed range.

Thereby, higher maneuverability in low speed range and better vehicle response in high speed range are accomplished at the same time.

According to another aspect of the present invention, some time delay is produced in transition from one mathematical function to another in proportion to the magnitude of the vehicle acceleration and, thereby, smooth transition from one mathematical function to another is attained. This time delay may be conveniently produced in the actuator for varying the steering angle ratio, thereby reducing the power requirement of the actuator.

BRIEF DESCRIPTION OF THE DRAWINGS

Such and other objects and advantages of the present invention will be better understood with reference to the following description and the appended drawings in which.

DETAILED DESCRIPTION OF THE PREFERRED EMBODIMENTS

Now preferred embodiments of this invention are described in the following with reference to the appended drawings.

Figure 1:
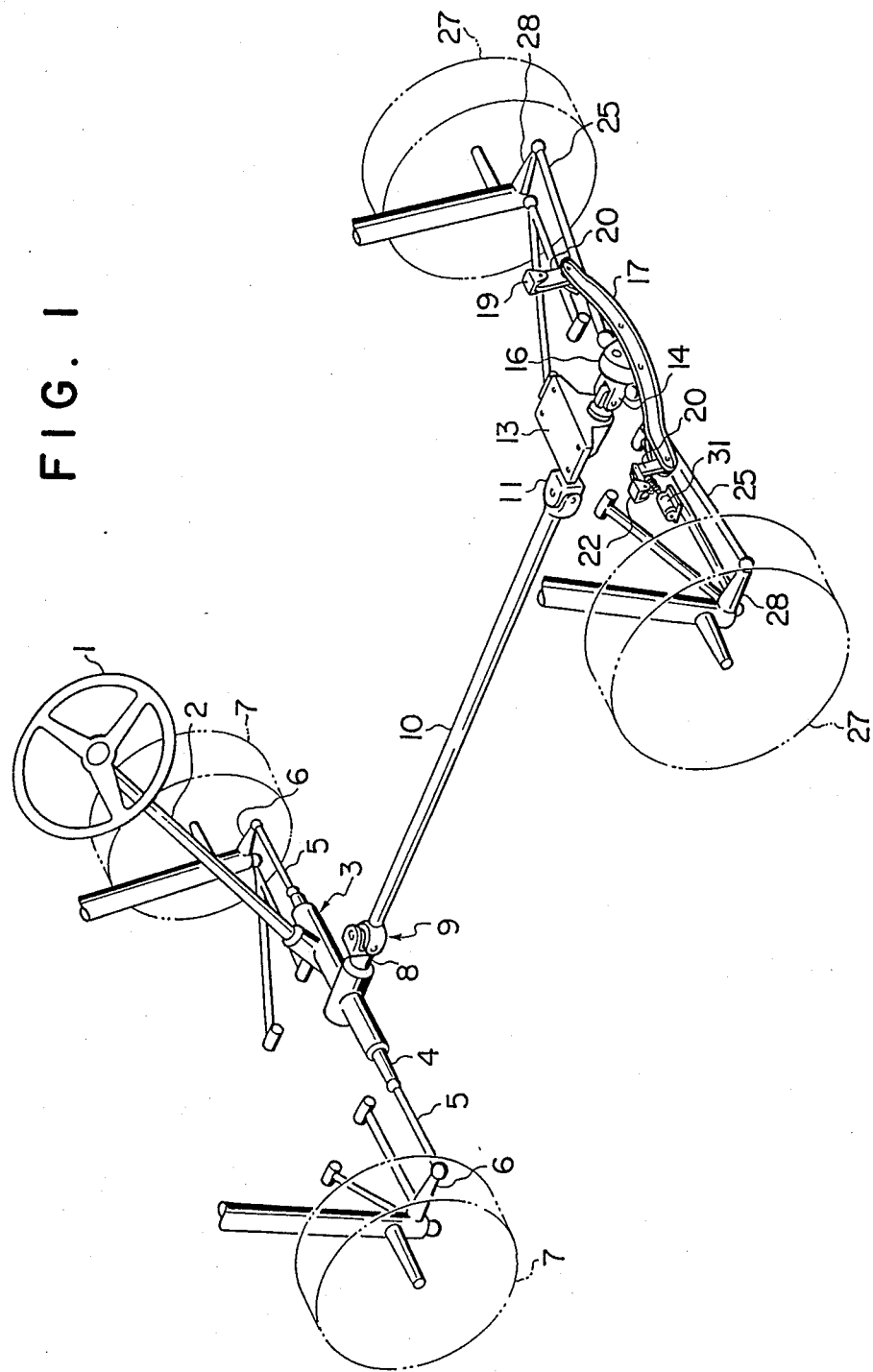
FIG. 1 is a perspective view showing the general basic structure of a vehicle provided with a front and rear wheel steering device according to this invention with the chassis of the vehicle removed.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 to the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Figure 2:
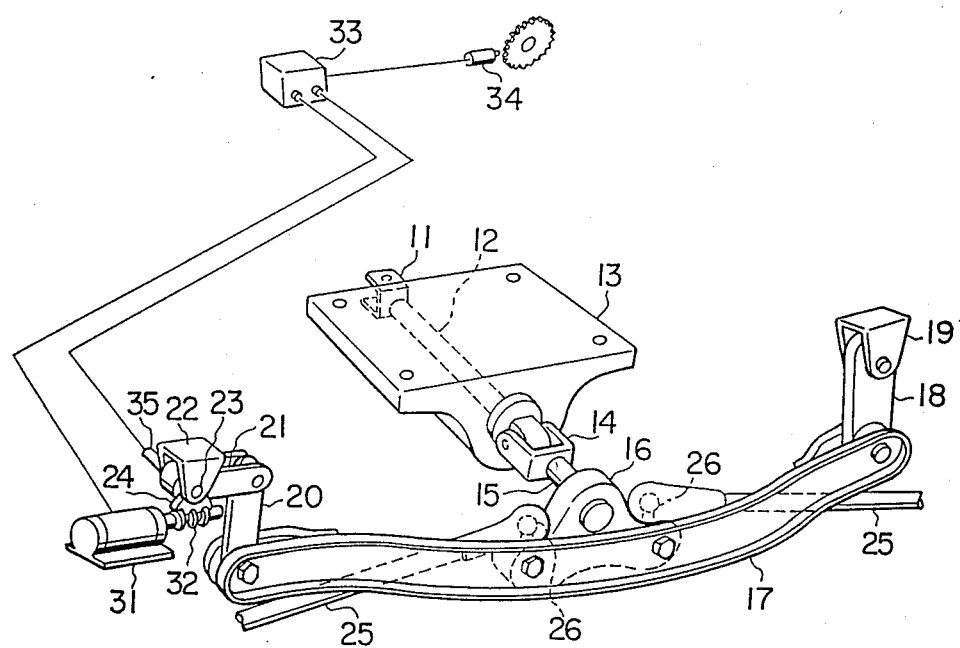
FIG. 2 is a magnified perspective view of a rear wheel steering system of the embodiment of FIG. 1.

Further, a swing shaft 15, which is described in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported by a middle part of an arm member 17 which is arranged along the widthwise direction of the vehicle.

An end of the arm member 17 is connected to the vehicle body by way of a link member 18 and a link bracket 19 while the other end of the arm member 17 is connected to the vehicle body by way of link members 20 and 21 and a link bracket 22 in such a manner that the arm member 17 may be able to swing in a vertical plane which is perpendicular to the longitudinal direction of the vehicle. A pivot shaft 23 of the link member 21 on the side of the bracket 22 can rotate integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm member 17 and an output shaft of the motor 31 is fixedly provided with a worm gear 32 which in turn meshes with a sector gear 24 integrally mounted to the pivot shaft 23 of the link member 21. Thus, the rotation of the motor 31 will cause the rotational motion of the arm member 17. Further, the vehicle is provided with a computer 33 which receives signals from a vehicle speed sensor 34 for detecting the vehicle speed and a position sensor 35 which detects the position of the pivot shaft 23 of the link member 21 and sends an appropriate control signal to the computer 33 according to the vehicle speed to control the rotation of the motor 31.

Figure 3:
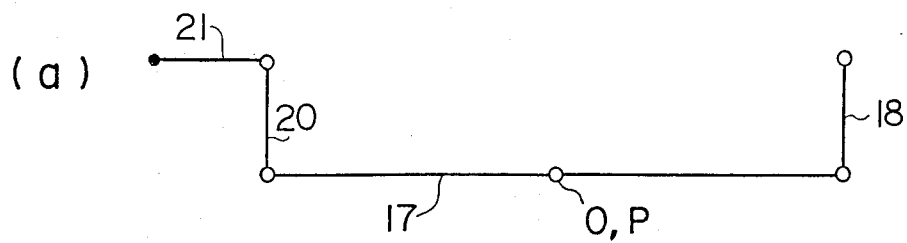
FIGS. 3 (a), (b) and (c) are broken away side views of the rear wheel steering system of FIG. 2, illustrating the working principle thereof.
Figure 3:
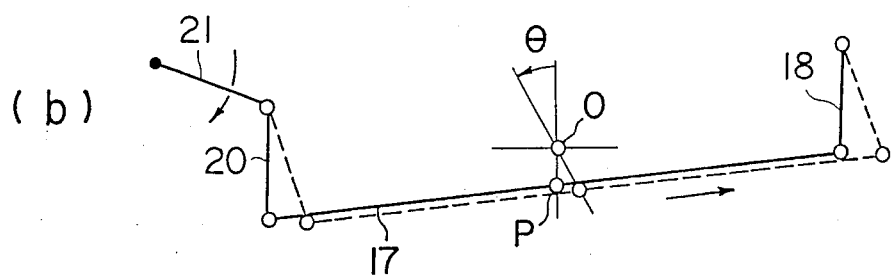
Figure 3:
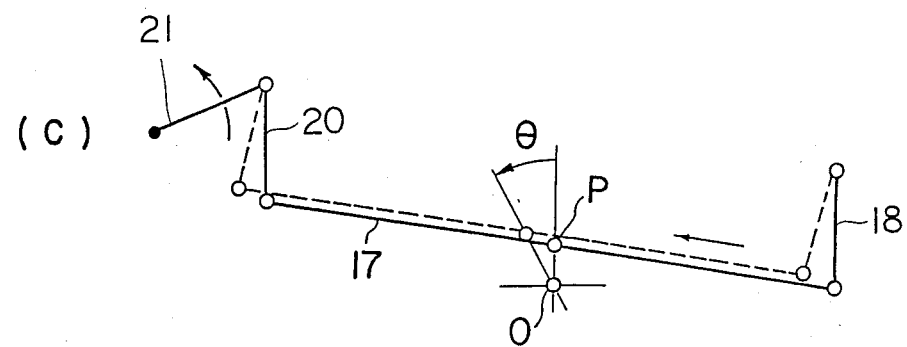

When the pivot point P of the joint member 16 coincides with the center O of the input shaft 12 as shown in FIG. 3 (a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

When the link member 21 is downwardly rotated by the rotation of the motor 31 by way of the worm gear 32 and the sector gear 24 meshing therewith, the arm member 17 inclines with its left end down as shown in FIG. 3 (b). Due to this inclination of the arm member 17, the pivot point P is located below the axial center O and, if the input shaft 12 is rotated for instance in counter-clockwise direction by angle theta, the tie rods 25 move rightwardly as indicated by broken lines in FIG. 3 (b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 3 (c). Due to this inclination of the arm member 17, the pivot point P is located above the axial center O and, if the input shaft 12 is rotated for instance likewise in counter-clockwise direction by angle theta, the tie rods 25 move leftward, as opposed to the previous case, as indicated by broken lines in FIG. 3 (c), to steer the rear wheels 27 in the same direction as the front wheels 7.

Now the action of the above-described embodiment will be described in the following with reference to FIGS. 4 and 5.

Figure 4:
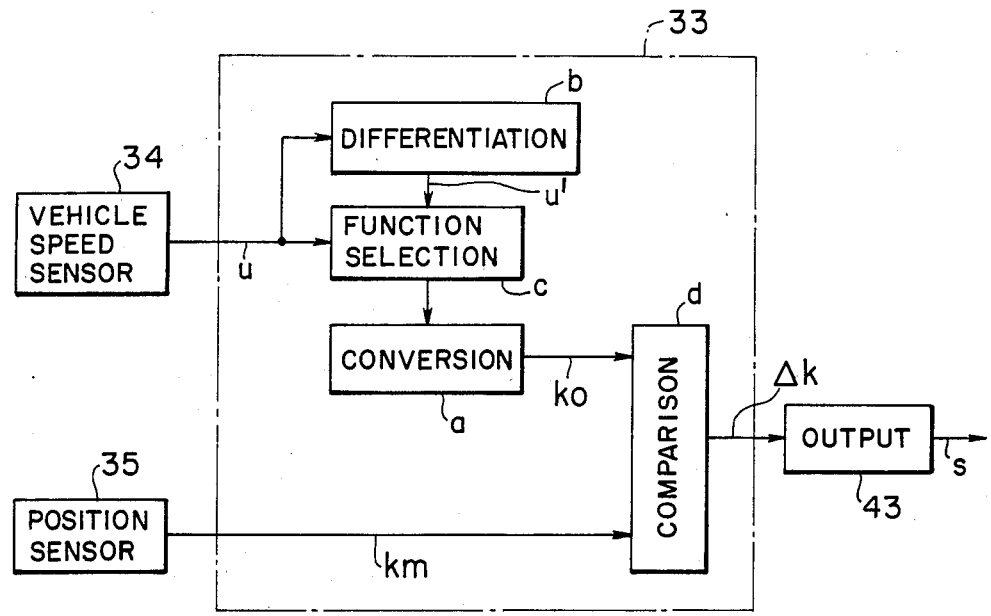
FIG. 4 is a functional block diagram of the control structure of the embodiment of FIGS. 1 to 3.

FIG. 4 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio function signal $k_0$ ($=f(u)$) by a conversion process (a). This function is selected (c) according to a vehicle speed change rate signal or an acceleration signal $u'$ obtained by differentiating the vehicle speed signal (b).

Figure 5:
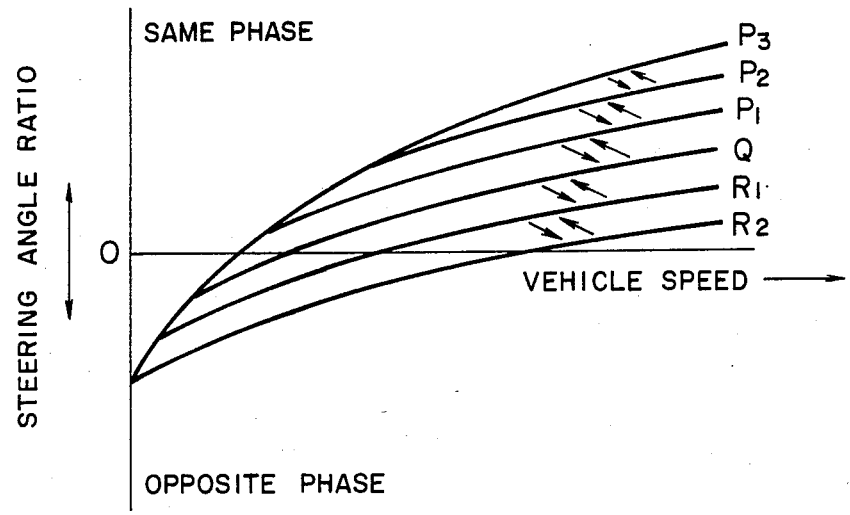
FIG. 5 is a graph showing the steering function characteristics of the embodiment shown in FIGS. 1 to 4.

As shown in FIG. 5, when the absolute value of the acceleration is within a certain range, the steering angle ratio function is given by curve Q, but, as the acceleration increases in its absolute value towards the negative side, curves P1, P2, ..., located above the curve Q in the graph, are sequentially selected. As the acceleration increases in its absolute value towards the positive side, curves R1, R2, ..., located below the curve Q in the graph, are sequentially selected. The number of the prepared mathematical functions in association with the curves P1, P2, ... and R1, R2, ... are quite arbitrary and may be as many as the storage area of the computer 33 allows. Therefore, it is possible to make the transition from one mathematical function to another look practically continuous.

The position sensor 35 detects the rotational position of the link member 21 which is proportional to the steering angle ratio in actual steering and the detected result is supplied to the computer 33 as actual steering angle ratio $k_m$. A relative difference delta $k = k_m - k_0$ is obtained by a comparison process (d). This difference delta k is supplied from the computer 33 to an output control device 43 as data corresponding to the correction of the steering angle ratio which is required to obtain the desired steering angle ratio. The output end of the output control device 43 is connected to the motor 31 and supplies thereto a control signal s corresponding to the difference delta k. Thus, the motor 31 is rotated in the direction which accomplishes the steering angle ratio corresponding to the current vehicle speed.

Thus, as shown in FIG. 5, in high speed range in which the steering angle ratio is generally positive or, in other words, the same phase relationship holds, the tendency of the vehicle to swerve to the outside of the curve when the vehicle is turning while accelerating is controlled by reducing the steering angle ratio of the rear wheels which are in the same phase relationship relative to the front wheels and the tendency of the vehicle to cut inside the curve when the vehicle is turning while decelerating is controlled by increasing the steering angle ratio of the rear wheels.

Figure 6:
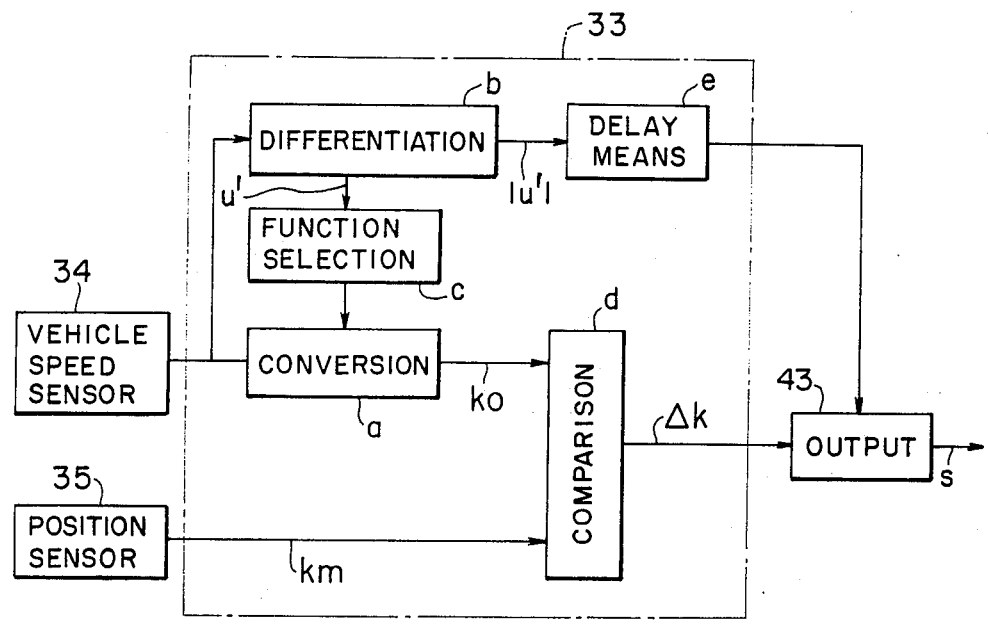
FIG. 6 is a functional block diagram of the control structure of a second embodiment.
Figure 7:
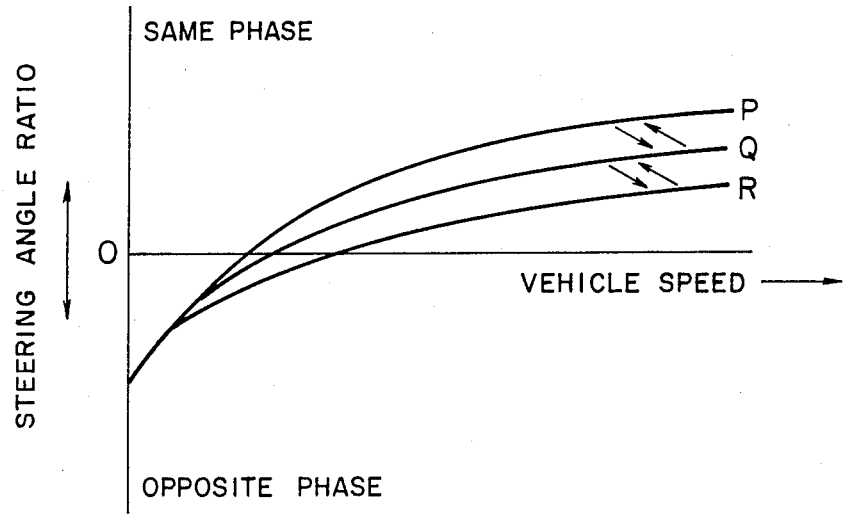
FIG. 7 is a graph showing the steering function characteristics of the second embodiment.

FIG. 6 shows another embodiment of the functional structure of the computer 33. According to this embodiment, the means for modifying the steering angle function depending on the magnitude of the change rate of the vehicle speed is similar to that of the previous embodiment, but, according to this embodiment, only three steering angle ratio functions P, Q and R are prepared as shown in FIG. 7.

Specifically, the curve Q is selected when the acceleration within a certain range; the curve R is selected when the acceleration is outside of the range towards the positive side; and the curve R is selected when the acceleration is outside of the range towards the negative side. The absolute value of the acceleration signal |u'| obtained by differentiating (b) the vehicle speed signal u is supplied to a delay circuit (e) and the time required to achieve the steering angle ratio determined by the function, which is selected upon detection of the acceleration exceeding a certain range, is varied by the delay circuit (e) acting upon the output device 43 in accordance with the magnitude of the acceleration. In other words, if the absolute value of the acceleration is great, the steering angle determined by the relevant functiion is achieved in a relatively short time and, coversely, if the sbsolute value of the acceleration is amall, the steering angle approaches the determined value rather slowly.

Thus, the present embodiment can provide an action similar to that of the previous embodiment without preparing so many mathematical functions.

Thus this invention can provide the significant advantages of favourable driving response even when the vehicle is decelerating or accelerating while turning, particularly in high speed range, thereby making the driving of the vehicle more comfortable, less tiring and safer, in addition to the conveniences of a front and rear wheel steering device that the driving response is favourable in high speed range and the maneuverability of the vehicle is favourable in low speed range.

In the above-described embodiments, the various processes conducted in the computer 33 are executed by a certain program (software) stored for instance in a storage area of the computer 33, but it is possible to utilize electric circuitry having a similar functionality to perform the same processes.

Further, this invention is not limited by the above-described embodiments, but may also be applied to front and rear wheel steering devices in which the front and the rear wheels are hydraulically controlled and the front steering angle information is transmitted by hydraulic pressure, or the front wheel steering angle is transmitted to the computer 33 as an electric signal.

We claim:

1. A front and rear wheel steering device for vehicle for variably controlling the steering angle ratio of rear wheels relative to the steering angle of front wheels according to vehicle speed, comprising:
   a vehicle speed sensor;
   a selection means for selecting a mathematical function from a plurality of mathematical functions representing the steering angle ratio of the rear wheels according to the change rate of the vehicle speed; and
   a rear wheel steering means for achieving a steering angle ratio corresponding to the selected mathematical function.

2. A front and rear wheel steering device as defined in claim 1, wherein at least one of the mathematical functions is positive in high speed range and negative in low speed range so as to steer the rear wheels in same phase relationship to the front wheels in high speed range and in opposite phase relationship in low speed range.

3. A front and rear wheel steering device as defined in claim 2, wherein transition from one of the mathematical functions to another takes place substantially without any time delay.

4. A front and rear wheel steering device as defined in claim 2, wherein transition from one of the mathematical functions to another takes place with some time delay.

5. A front and rear wheel steering device as defined in claim 4, wherein the time delay is caused by delay means acting upon the means for achieving the steering angle ratio.

6. A front and rear wheel steering device as defined in claim 4 or 5, wherein the number of the mathematical functions is three.

7. A front and rear wheel steering device as defined in claim 1, wherein at least some of the mathematical functions are positive in high speed range and negative in low speed range so as to steer the rear wheels in same phase relationship to the front wheels in high speed range and in opposite phase relationship in low speed range, the value of the selected mathematical function in high speed range increasing with the increase in the acceleration of the vehicle and decreasing with the increase in the deceleration of the vehicle.

* * * * *